(12) United States Patent  
Ueno et al.

(10) Patent No.: US 7,920,159 B2  
(45) Date of Patent: Apr. 5, 2011

(54) ELECTRONIC CONFERENCE SYSTEM, ELECTRONIC CONFERENCE CONTROLLER, INFORMATION TERMINAL DEVICE, AND ELECTRONIC CONFERENCE SUPPORT METHOD

(75) Inventors: Yuichi Ueno, Kanagawa (JP); Motoyuki Takaai, Kanagawa (JP); Eriko Tamaru, Yokohama (JP); Hitoshi Abe, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1190 days.

(21) Appl. No.: 11/527,312

(22) Filed: Sep. 26, 2006

(65) Prior Publication Data

US 2007/0200922 A1  Aug. 30, 2007

(30) Foreign Application Priority Data

Feb. 15, 2006  (JP) .................................. 2006-038371

(51) Int. Cl.
*H04N 7/14* (2006.01)

(52) U.S. Cl. ................. 348/14.08; 348/14.1; 348/14.12; 370/260; 370/261

(58) Field of Classification Search .... 348/14.01–14.16; 715/753, 755, 751; 709/204; 370/260–161
See application file for complete search history.

(56) References Cited

U.S. PATENT DOCUMENTS

| 5,694,544 | A | 12/1997 | Tanigawa et al. |
| 7,533,146 | B1 * | 5/2009 | Kumar ........................... 709/205 |
| 2005/0062844 | A1 * | 3/2005 | Ferren et al. ............... 348/14.08 |

FOREIGN PATENT DOCUMENTS

| EP | 0497022 | 4/1999 |
| EP | 0497022 | 7/1999 |
| JP | 10079735 | 3/1998 |
| JP | 2000236329 | 8/2000 |
| JP | 2003234862 | 5/2003 |
| JP | 2004317583 | 11/2004 |
| WO | 2005029739 | 3/2005 |

OTHER PUBLICATIONS

Office Action issue on Feb. 27, 2008 from the Australian Patent Office for corresponding Australian Patent Application No. 2006222713 by Fuji Xerox Co., Ltd.

* cited by examiner

*Primary Examiner* — Melur Ramakrishnaiah
(74) *Attorney, Agent, or Firm* — Gauthier & Connors LLP

(57) ABSTRACT

There is provided an electronic conference system, including a display controller that arranges and displays a marker for specifying a display position on a display screen of a display apparatus which placed in a conference room, a unit that obtains information concerning the display position of each marker included in an image capturing range obtained by capturing an image of a portion of the display screen by a conference participant using an information terminal device and that specifies an image capturing region on the display screen based on the information concerning the display position of each marker that is obtained, and a unit that combines image data displayed on the display apparatus at the time of image capturing performed using the information terminal device having an image capturing function with display data, to be displayed in the image capturing region that is specified, to generate a screen image.

16 Claims, 13 Drawing Sheets

| DISPLAY CONTENT ID | MARKER ID | MARKER X COORDINATE (x0) | MARKER Y COORDINATE (y0) |
|---|---|---|---|
| 698154 | 792021 | 0.05 | 0.05 |
| 698154 | 792022 | 0.10 | 0.05 |
| 698154 | 792023 | 0.15 | 0.05 |
| 698154 | 792024 | 0.20 | 0.05 |
| ... | ... | ... | ... |

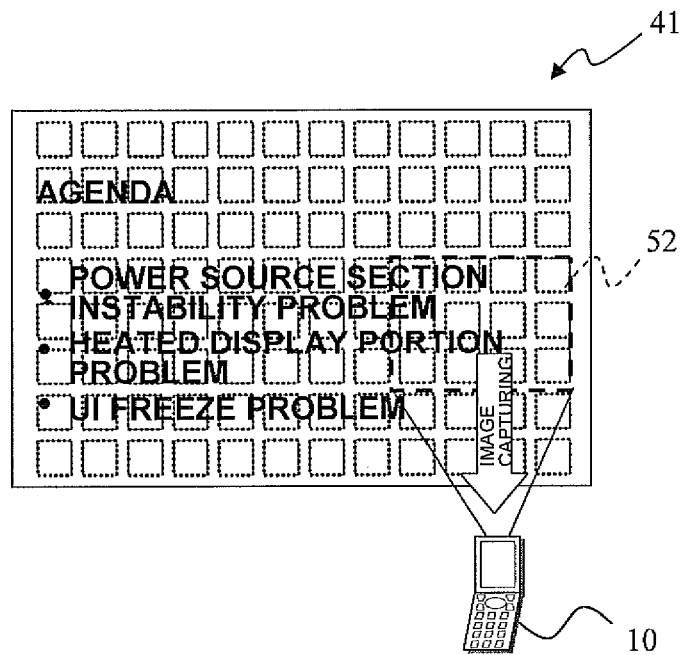

Fig. 8

| To: MAIL ADDRESS OF DISPLAY INFORMATION MANAGEMENT SERVER
From: MAIL ADDRESS OF MOBILE PHONE USER
Subject: Projection mode
Attachment-File1: IMAGE DATA FILE
Attachment-File2: ATTACH IMAGE DATA FILE
BODY: |

Fig. 9A

To: MAIL ADDRESS OF DISPLAY INFORMATION MANAGEMENT SERVER
From: MAIL ADDRESS OF MOBILE PHONE USER
Subject: Projection mode
Attachment-File1: IMAGE DATA FILE

BODY:
URL OF ATTACH IMAGE DATA FILE

Fig. 9B

| DISPLAY CONTENT ID | DISPLAY IMAGE STORAGE LOCATION INFORMATION (URL) | DISPLAY REGION COORDINATES (LEFT END (x1), UPPER END (y1), RIGHT END (x2), LOWER END (y2)) |
|---|---|---|
| 698154 | http://... | (0.65, 0.35, 075, 0.45) |
| 698154 | http://... | (0.15, 0.20, 0.40, 0.40) |
| 698155 | http://... | (0.50, 0.55, 0.70, 0.75) |
| 698156 | http://... | (0.25, 0.05, 0.30, 0.10) |
| ... | ... | ... |

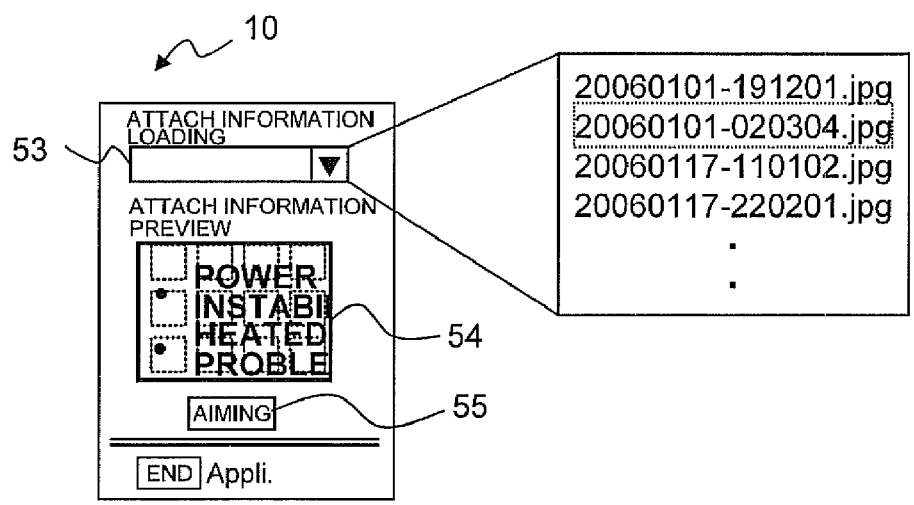
Fig. 17A
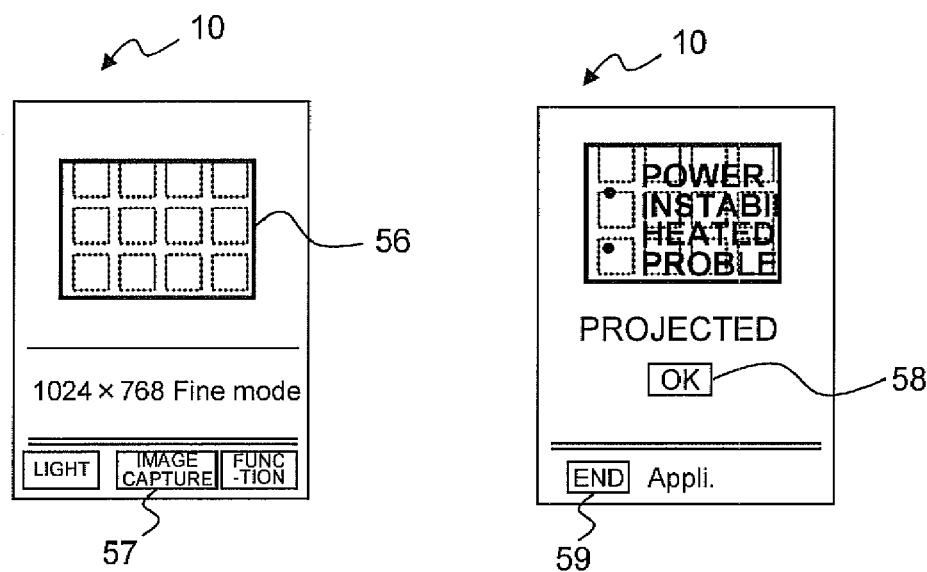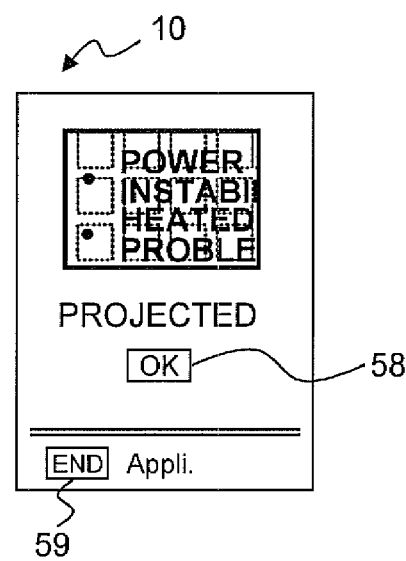
Fig. 17B  Fig. 17C

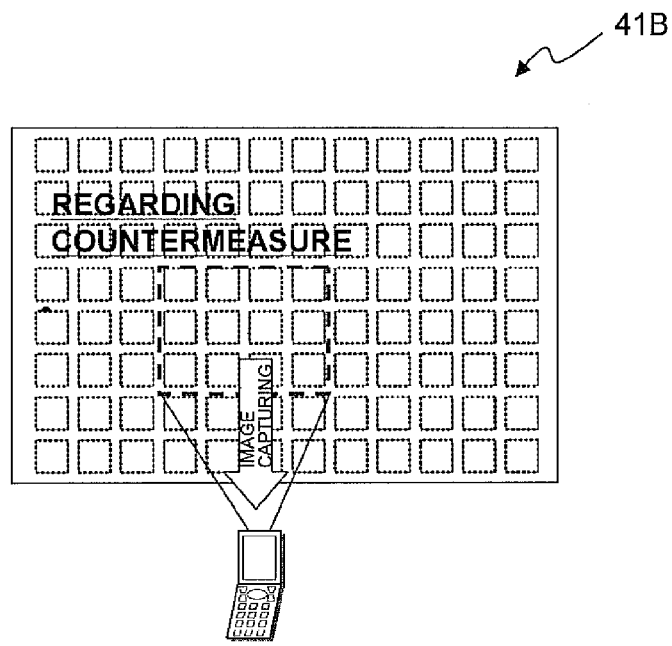
Fig. 18
```
To: MAIL ADDRESS OF DISPLAY
MANAGEMENT SERVER
From: MAIL ADDRESS OF MOBILE PHONE
USER
Subject: Copy and Paste mode
Attachment-File1: COPY SOURCE IMAGE
CAPTURING DATA
Attachment-File2: COPY DESTINATION
IMAGE CAPTURING DATA
BODY:
```
Fig. 19
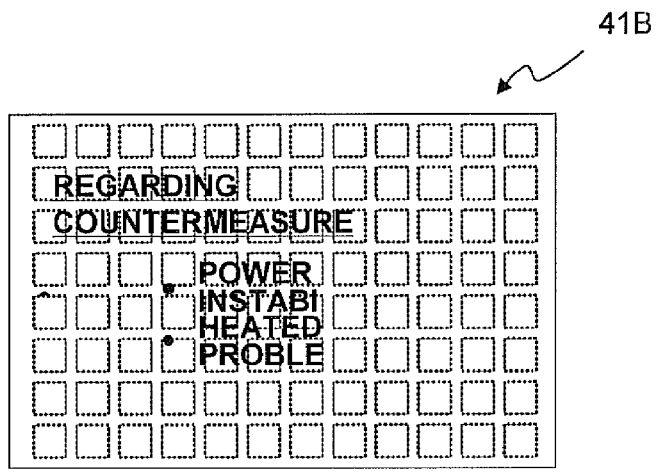
Fig. 20 ature of a conference that

ELECTRONIC CONFERENCE SYSTEM, ELECTRONIC CONFERENCE CONTROLLER, INFORMATION TERMINAL DEVICE, AND ELECTRONIC CONFERENCE SUPPORT METHOD

BACKGROUND

1. Technical Field

The present invention relates to an electronic conference system, and particularly to a method of extemporaneously displaying additional image data in a type of conference that is conducted while reference materials for the conference are being displayed on a display device.

2. Related Art

Recently, quite a lot of companies have introduced electronic conference systems so as to improve the efficiency of meetings. An electronic conference system is not necessarily limited to a conference that is conducted while conference participants located at places remote from each other are interconnected via a network, and can simply be defined as a conference which is conducted with conference participants using their own information devices such as computers.

Conventional electronic conference systems include a system that has a system structure including a touch panel display device placed in a conference room such as an electronic white board. Use of such a touch panel display device allows each conference participant to refer to the same reference materials and also allows the participants to have discussions while putting writing on the displayed material, as necessary. In general, a presenter of a conference previously prepares for reference materials to be displayed on the touch panel display device by making them electronically available, for example, and at the conference, the presenter appropriately changes the display materials in accordance with the subject of discussion.

SUMMARY

According to an aspect of the invention, there is provided an electronic conference system, including a display, an information terminal device having an image capturing function, a display controller that controls the display to display an image and a marker for specifying a display position on a screen of the display, a marker management unit that stores information concerning the display position of the marker, an image capturing data obtaining unit that obtains image capturing data generated by capturing, when the marker is displayed, an image of at least a part of the screen using the information terminal device, an specification unit that specifies the display position of the marker included in the image capturing data based on the information stored in the marker management unit, a display data obtaining unit that obtains display data to be displayed, and a display image combining unit that displays the display data at a position of the screen, the position corresponding to the specified display position of the marker.

BRIEF DESCRIPTION OF THE DRAWINGS

Exemplary embodiments of the present invention will be described in detail based on the following figures, wherein:

FIG. 8 is a conceptual view when a conference participant captures an image of a portion on a screen of the large display in the first exemplary embodiment;

FIG. 9A and FIG. 9B show example contents of electronic mail messages to be transmitted to a display information management server in the first exemplary embodiment;

FIG. 17A, FIG. 17B, and FIG. 17C show a transition of a display screen of a mobile phone in the second exemplary embodiment;

FIG. 18 is a conceptual view when a conference participant captures a portion of an image on a screen of a copy destination large display in the second exemplary embodiment;

FIG. 19 shows an example content of an electronic mail message to be transmitted to a display information management server in the second exemplary embodiment;

FIG. 20 is a view showing an example screen display after a paste process on the large display is performed in the second exemplary embodiment.

DETAILED DESCRIPTION

Exemplary embodiments of the present invention will be described in detail with reference to the accompanying drawings.

Exemplary Embodiment 1

Figure 1:
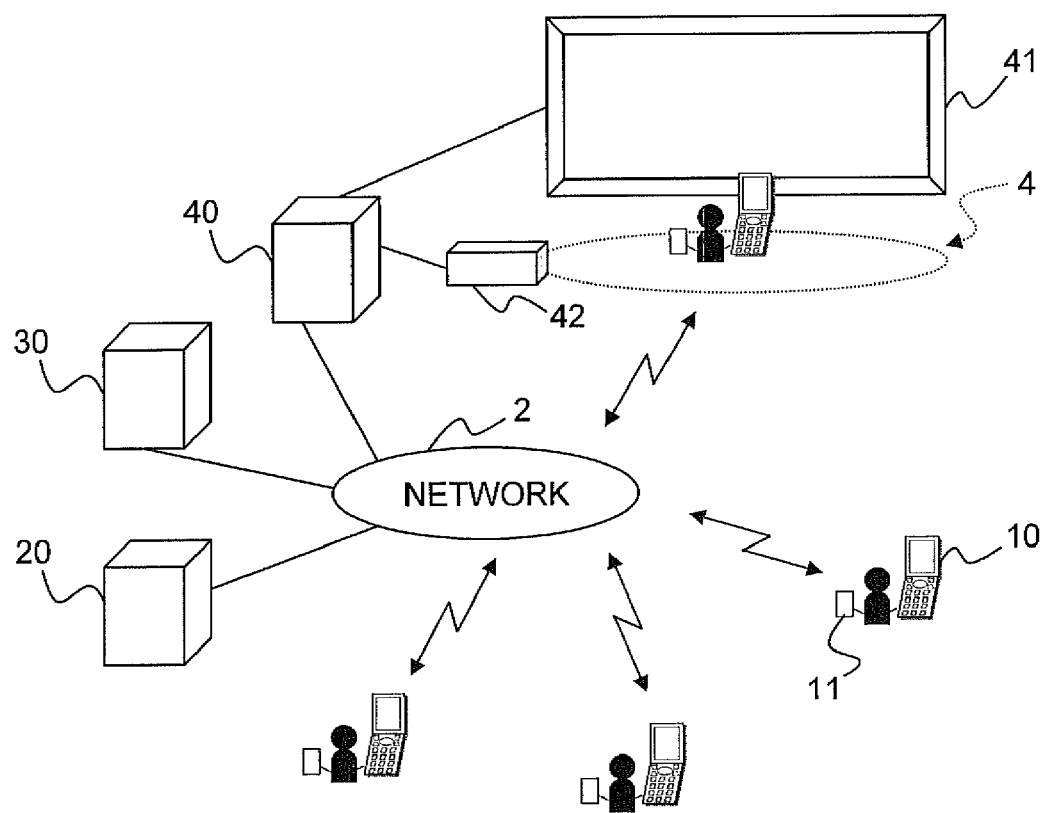
FIG. 1 schematically shows an overall structure of an electronic conference system according to a first embodiment of the present invention.

FIG. 1 schematically shows an overall structure of an electronic conference system according to one exemplary embodiment of the present invention. Referring to FIG. 1, a structure in which a mobile phone 10, a document management server 20, a display information management server 30, and a conference server 40 are mutually connected via a network 2 is shown. The mobile phone 10, which is a mobile cellular phone provided with a camera function, is used by a participant of a conference that is conducted using an electronic conference system. Each conference participant also carries an RFID tag 11 along with the mobile phone 10. The document management server 20 is a server computer that is used for storing and managing image data which is generated by digitizing conference materials or the like. The display information management server 30 is a server computer that is used for receiving, storing and managing display information transmitted from the mobile phone 10. The conference server 40 is a server computer that is used for controlling a whole electronic conference system. A large display 41 placed in a conference room and an RFID sensor 42 are connected to the conference server 40. The large display 41 is a display apparatus placed at a position that can be seen from all the conference participants in the conference room and used for presentation. The RFID sensor 42 is a detection unit that detects the RFID tag 11 carried by each conference participant to thereby detect approach of a conference participant to the large display 41. In FIG. 1, a detection region 4 is conceptually shown by a dotted line.

Here, while the network 2 may be implemented by various communication networks such as a mobile cellular telephone network, a LAN that is installed within an office using the electronic system, and so on, FIG. 1 shows the network 2 in a simplified manner, because the network structure itself is not the main subject matter of the present exemplary embodiment.

Figure 2:
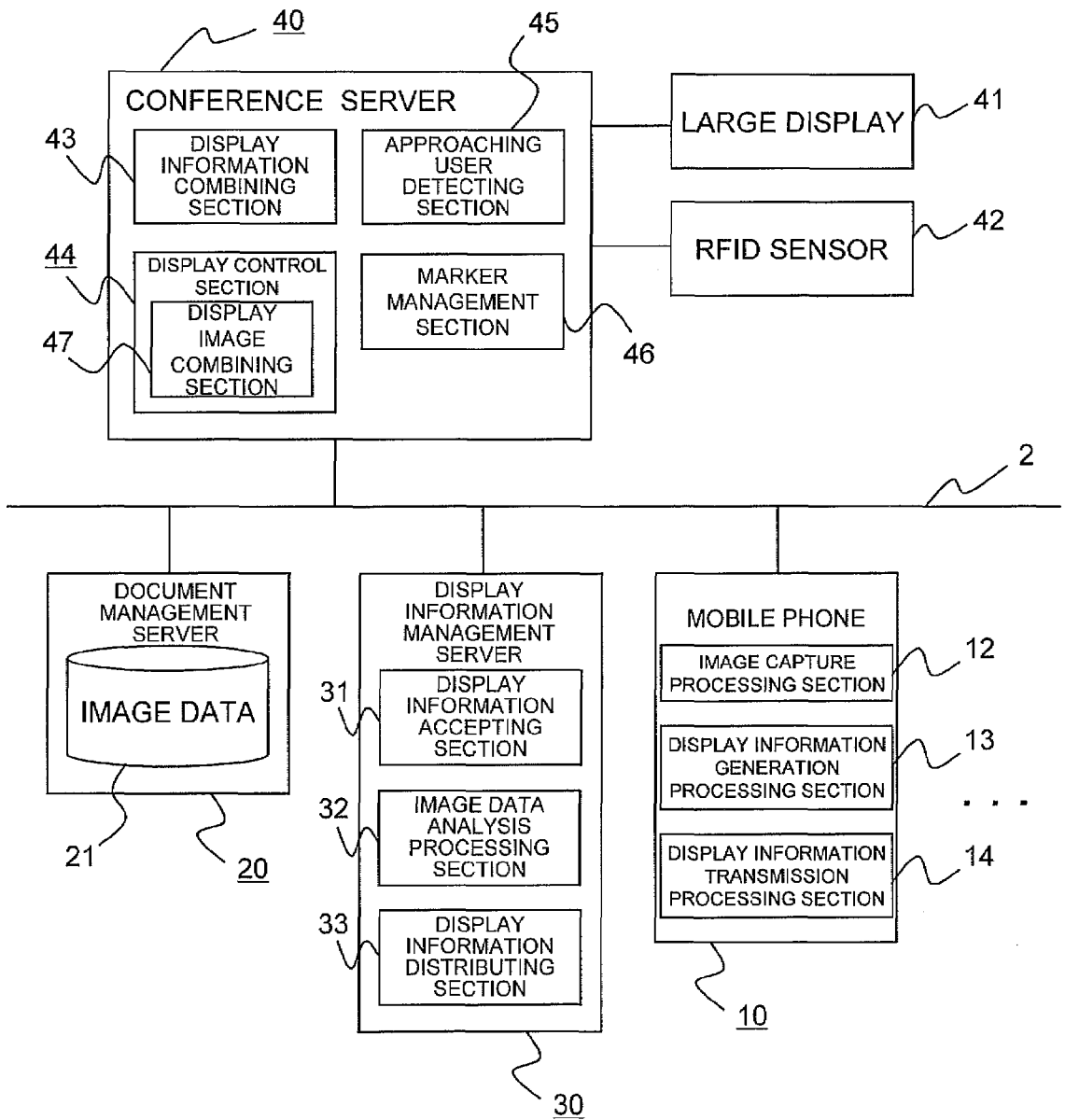
FIG. 2 is a block structural diagram of the electronic conference system of the first exemplary embodiment.

FIG. 2 is a block diagram showing a structure of the electronic conference system according to the present exemplary embodiment. In FIG. 2, elements corresponding to those in the apparatus of FIG. 1 are designated by the same numerals.

The mobile phone 10 includes an image capture processing section 12, a display information generation processing section 13, and a display information transmission processing section 14. The image capture processing section executes a function of a camera mounted in the mobile phone 10 to generate image capturing data. The display information generation processing section 13 associates the image capturing data obtained by capturing an image of a portion of the large display 41 with information concerning display data to be displayed on the large display 41 to thereby generate display information. The display information transmission processing section 14 transmits the display information that is generated to the display information management server 30 using an electronic mail function. The process function in each section 12 to 14 of the mobile phone 10 is implemented by a collaborative operation of a CPU installed in the mobile phone 10 and an electronic conference support program running on the CPU.

The document management server 20 includes an image data memory section 21 that stores image data to be displayed on the large display 41. The conference material data that is previously prepared by a presenter of a conference or the like is stored and managed in the document management server 20.

The display information management server 30 includes a display information accepting section 31, an image data analysis processing section 32, and a display information distributing section 33. The display information accepting section 31 receives display information transmitted from the mobile phone 10 to accept a display instruction from a conference participant concerning image data the participant wishes to additionally display on the large display 41. The image data analysis processing section 32 performs image analysis with respect to the received image data to specify each marker ID of a marker whose image is captured and the conference server 40 to be connected to the large display 41. The display information distribution section 33 transmits the display information having been subjected to the image analysis to the conference server 40 that is specified. The process function in each section 31 to 33 of the display information management server 30 is implemented by a collaborative operation of a computer that establishes the display information management server 30 and an electronic conference support program running on a CPU installed in the computer.

The conference server 40 includes a display information combining section 43, a display control section 44, an approaching user detecting section 45, and a marker management section 46. The display information combining section 43 receives the display information transmitted from the display information management server 30 and, based on the display information, associates display image data requested by the mobile phone 10 with a display region in the large display 41 designated by the conference participant using the mobile phone 10, such that the display information can be displayed in the display region. The display control section 44 performs general display control of the large display 41 by arranging and displaying markers, which will be described in detail below, in lines all over the large display 41 like lines of tiles, for example. A display image combining section 47 included in the display control section 44 synthesizes image data being displayed on the large display 41 when the conference participant captures an image of the large display using their mobile phone 10 with the display image data that is associated with the display region by the display information combining section 43, thereby generating a screen image to be displayed on the large display 41. The approaching user detecting section 45, due to a collaborative operation with the RFID sensor 42, detects the RFID tag 11 to thereby detect any of the conference participants approaching the large display 41. The marker management section 46 stores and manages information concerning the display position of a marker displayed on the large display by the display control section 44. The process function in each section 43 to 46 of the conference server 40 is implemented by collaborative operation of a computer which establishes the conference server 40 and an electronic conference support program running on a CPU installed in the computer.

Figures 3, 4:
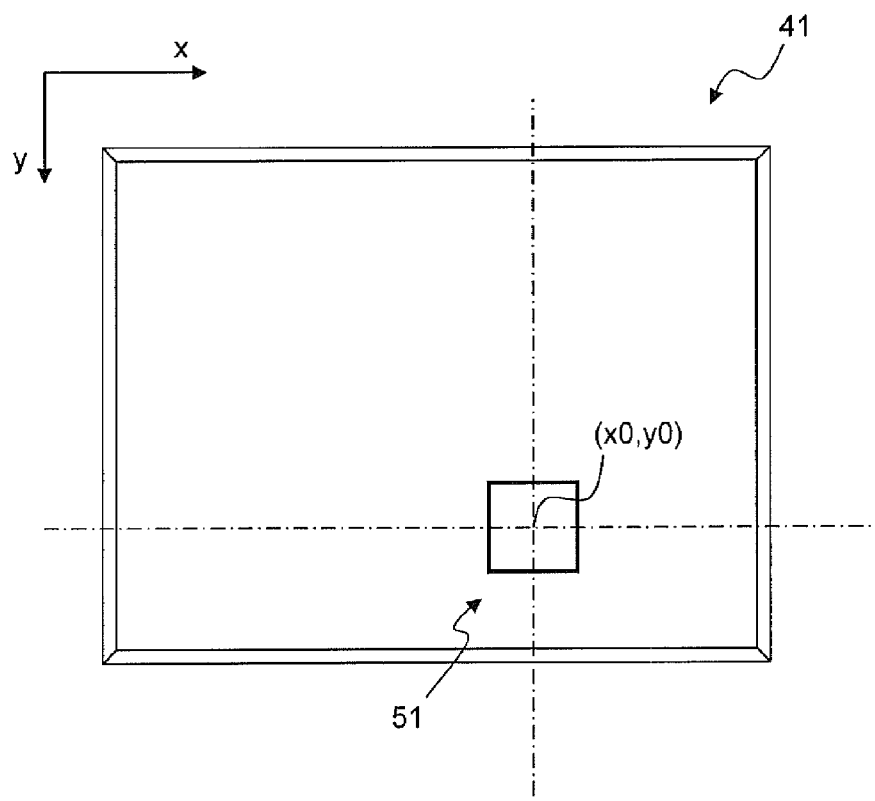
FIG. 3 is a view showing an example setting of information concerning a display position of a marker stored and managed by a marker management section in the first exemplary embodiment.
FIG. 4 is a conceptual view showing a positional relationship between a large display and each marker in the first exemplary embodiment.
Figure 5:
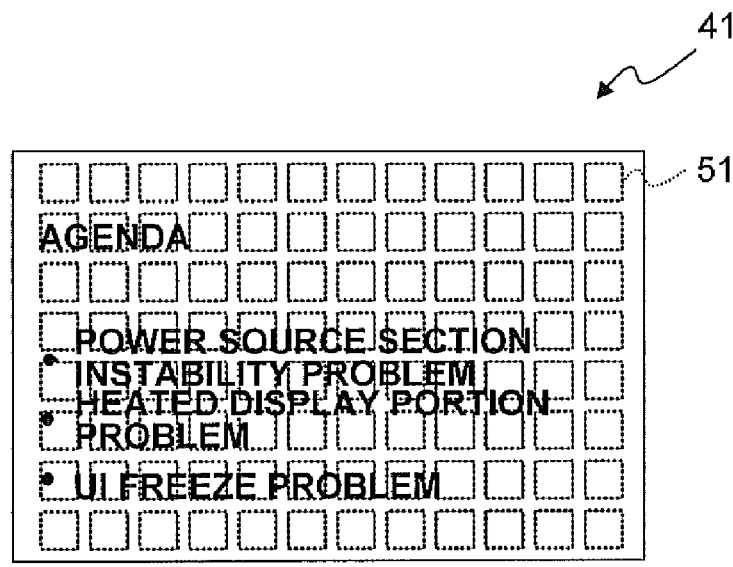
FIG. 5 is a view showing a screen example when markers are displayed on the large display in the first exemplary embodiment.

FIG. 3 shows an example setting of information concerning the display positions of the markers stored and managed by the marker managing section 46. FIG. 4 is a conceptual view showing the positional relationship between the large display 41 and each marker. Further, FIG. 5 shows a screen example when the markers are displayed on the large display 41. The markers used in the present exemplarily embodiment will be described with reference to FIGS. 4 to 6.

The marker 51 is code data that is expressed by encoding a marker ID and is displayed on the large display 41 as illustrated in FIG. 5 when required, under control of the display control section 44. While the marker 51 is shown in each figure of the present exemplary embodiment as a blank portion for the sake of convenience, it is assumed in the present exemplary embodiment that the marker 51 is formed of binary data with a black and white display pattern such as a QR code. The marker ID, that is a code which can distinguish a certain marker from other markers, contains therein identification data of the conference server 40 that displays the marker, in the present exemplary embodiment. The marker is renewed each time it is displayed on the large display 41.

Assuming that coordinate data of the center position of a square marker 51 is represented as (x0, y0) as shown in FIG. 4, the center coordinate data that is set as the display position information of each marker is associated with a corresponding marker ID and registered in a marker management table shown in FIG. 3. While in the present exemplary embodiment, the sizes of all the makers are identical and are fixed, the markers may have different sizes. In this case, data concerning the sizes may also be registered in the marker management table. According to the present exemplary embodiment, because the display position of the marker is defined based on the relative positional relationship of each marker with respect to the size of the large display 41, i.e. based on the ratio obtained when the length of each side of the large display 41 in the X or Y direction is assumed to be 1, it is easy to adapt to expansion and reduction of the image data to be displayed on the large display 41. As described above, the marker ID of the present exemplary embodiment is information that specifies the display position in the large display 41. Accordingly, when an image of the large display 41 where the markers are displayed is captured by a camera of the mobile phone 10, the image capturing region for the camera can be specified by specifying the marker ID contained in the image capturing data. However, while it is possible to specify the image capturing region, i.e. which portion of the large display 41 is captured, by recognizing the marker ID as described above, it is not possible to specify the screen image being displayed on the large display 41 when image capturing is performed by the camera of the mobile phone 10. In order to cope with this disadvantage, according to the present exemplary embodiment, a display content ID that is allocated to the screen data displayed on the large display 41 when image capturing using the camera of the mobile phone 10 is performed is also set in association with the marker ID. Each time a new screen image is displayed, a record corresponding to the display content ID is generated and registered.

According to the present exemplary embodiment, it is possible to display image data captured by the mobile phone 10 in a desired display region of the large display 41 with a simple user operation. The operation of the present exemplary embodiment that is performed for displaying the image data captured by the mobile phone 10 on the large display 41 during a conference will now be described.

First, conference participants, each carrying the mobile phone 10 and the RFID tag 11 for individual use, gather in a conference room and then a conference starts. Conference reference data to be used during the conference is pre-registered in the document management server 20 by a presenter or the like, and the conference is conducted while the presenter is changing image data displayed on the large display 41. In a normal conference using this electronic conference system, the image data can be displayed in the same manner as conducted conventionally, and therefore such a display method will not be described here.

Figure 6:
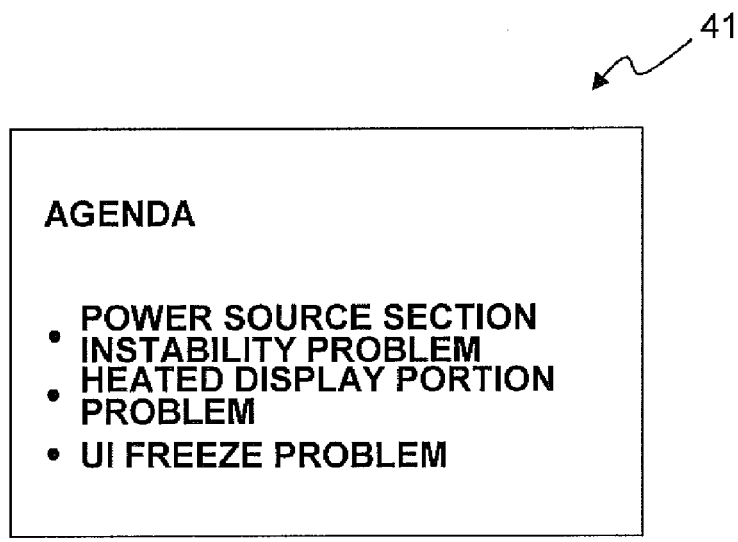
FIG. 6 is a view showing a screen display example of conference reference materials displayed on the large display in the first exemplary embodiment.

Here, it is assumed that in the course of discussion concerning malfunction of equipment or the like during a conference, it is desired to display a photograph indicating such a problem on the large display 41. It is further assumed that this photograph is not pre-registered in the document management server 20 and is stored only in the mobile phone 10 of a particular conference participant. In such a case, the conference participant who holds the photograph moves directly to the large display 41 in order to allow the photograph to be displayed on the large display 41. When the conference participant enters the detection region 4 of the RFID tag 11 detected by the RFID sensor 42, the approaching user detecting section 45 detects the approach of the conference participant to the large display 41. The display control section 44, on detection of the conference participant by the approaching user detecting section 45, displays the markers on the large display 41. For example, when approach of the conference participant is detected while the conference materials shown in FIG. 6 are being displayed on the large display 41, the display control section 44 displays the markers such that they are superposed on the conference materials being displayed, as shown in FIG. 5.

Figure 7A:
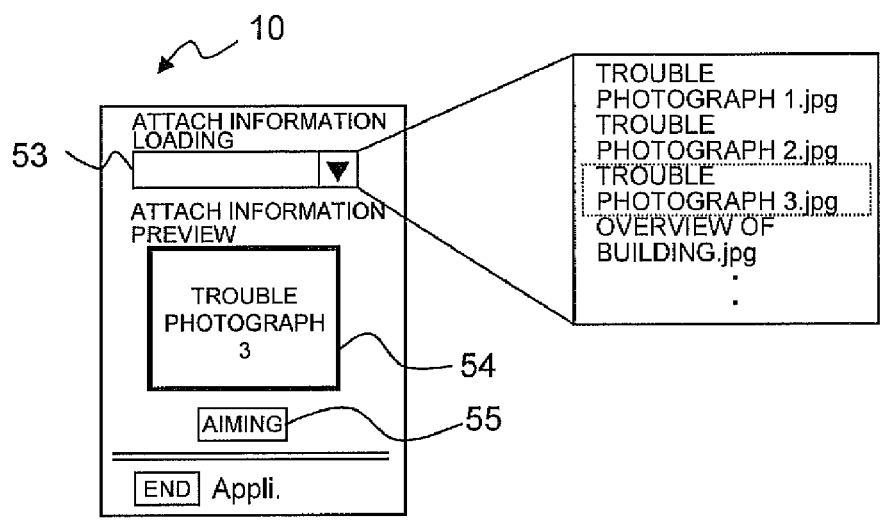
FIG. 7A, FIG. 7B, and FIG. 7C show a transition of a display screen of a mobile phone in the first exemplary embodiment.
Figures 7B, 7C:
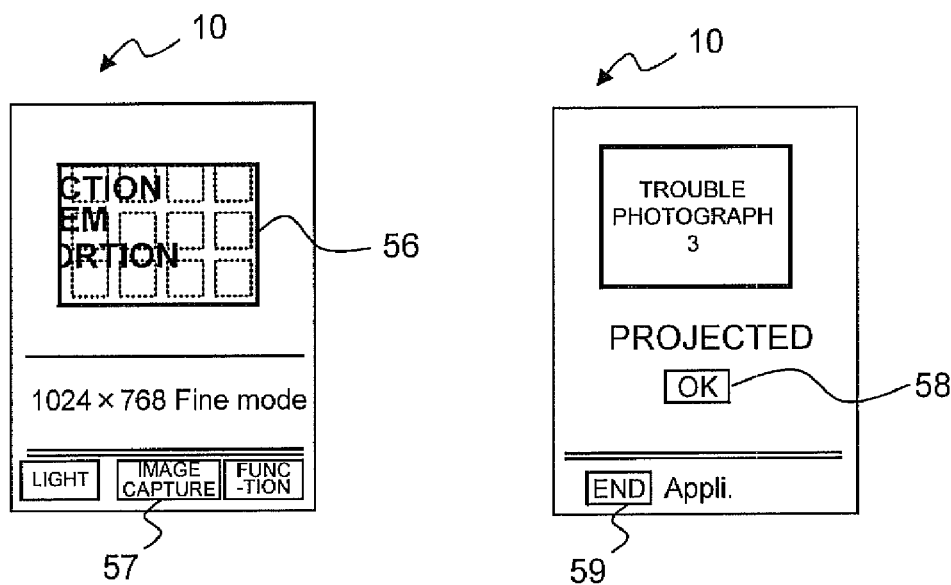

On the other hand, the following process is performed using the mobile phone 10. Specifically, the conference participant, now standing in front of the large display 41, starts an application provided in the present exemplary embodiment. FIGS. 7A to 7C show a transition of the display screen that is implemented by a part of the present application and is generated and displayed by the display information generation processing section 13. Once the application is started, the screen shown in FIG. 7A is first displayed. This screen layout shows an attached information loading setting region 53 for selecting a file name of image data that the conference participant wishes to display on the large display 41, a thumbnail display region 54 for displaying an image to be transmitted in thumbnail form, and an aiming button 55. Here, as each of the aiming button 55 and other various buttons described below corresponds to any of the buttons of the mobile phone 10, a particular button provided on the mobile phone 10 is actually pressed.

The conference participant first selects the image data to be displayed from among a list of image data files stored in the mobile phone 10. FIG. 7A shows an example in which a "trouble photograph 3.jpg" is selected. The image data selected by the conference participant can be confirmed by displaying the image data on the thumbnail display region 54. After selecting and confirming the image to be transmitted on the thumbnail display region 54, the conference participant then presses the aiming button 55, thereby starting the image capture processing section 12 that provides a camera function. Then, with the markers 51 being displayed on the large display 41 as described above, the conference participant captures an image of a portion of the display screen of the large display 41. FIG. 8 shows a conceptual view when such image capturing is performed. Further, FIG. 7B shows a display example on the mobile phone 10 at the time of aiming, in which the image capturing range captured by a lens of the camera is displayed in the display region 56.

In FIG. 8, the image capturing range 52 indicated by a broken line is a range in which an image is captured by the mobile phone 10 and corresponds to a display region for the photograph which is to be provided. The image capturing range 52, which is normally in a shape of a rectangle, as shown in FIGS. 7B and 8, includes plural square markers 51. The number of markers 51 included in the image capturing range 52 depends on the shapes of the image capturing range 52 and the markers 51 and the size relationship between them. When the conference participant presses the image capturing button 57 to capture an image, the image capture processing section 12 generates image data in the image capturing range displayed in the display region 52.

In the above process, in order to allow the photograph provided by a conference participant to be displayed on the large display 41, the conference participant is allowed to capture an image of a portion of the display portion of the large display 41 as a display region for the photograph. Then, in order to correlate the image capturing region captured by the mobile phone 10 to the display region of the photograph, according to the present exemplary embodiment the markers 51 are used to specify each display position on the large display 41. More specifically, the conference participant wishes to capture an image of the markers 51, and not of the conference materials, conference by means of the mobile phone 10. It is therefore desirable to perform display control such that the captured marker ID can be reliably extracted from the image capturing data, such as by displaying the conference materials in a lighter tone once the conference participant enters the detection region 4 of the RFID sensor 42, for example. While it is possible to completely erase the conference materials being displayed, in that case, when the conference participant wishes to display the photograph in a free space where no character strings or the like exist, it would be difficult to accurately locate that space. Thus, according to the present exemplary embodiment, the conference materials are displayed on the large display in such a manner that would not interfere with detection of the marker ID that is captured. Alternatively, as the markers 51 and the conference materials are displayed in a superimposed manner, it is also possible to display the conference materials in the background of the markers 51.

Further, in the present exemplary embodiment, display control for displaying the markers 51 on the screen or displaying the conference materials in a lighter tone is triggered at the time of detection of entrance of a conference participant into the detection region 4. At the same time, a conference participant is not allowed to capture an image of the markers 51 displayed on the large display 41 until the conference participant enters the detection region 4. Accordingly, it is desirable to set the range and position of the detection region in view of the above facts.

In the present exemplary embodiment, the RFID sensor 42 and the RFID tag 11 are used to automatically detect approach of a conference participant to the large display 41, thereby allowing display control of the markers 51 or the like described above. With the processes described above, however, because the purpose of allowing the conference participant to capture an image by using the mobile phone 10 is to capture an image of the markers 51, the RFID sensor 42 or the like need not necessarily be used. Alternatively, it is also possible to cause a conference participant to perform a certain manual operation such as touching the large display 41, operating the input unit of the conference server 40, and so on, so that display of the markers 51 or the like is triggered by detection of such a user operation.

As described above, when image capturing performed by pressing the image capturing button 57 of the mobile phone 10 is completed, the display information transmission processing section 14 uses an electronic mail function of the mobile phone 10 to generate and transmit display information necessary for display on the large display 41 to the display information management server 30, as an electronic mail.

FIGS. 9A and 9B show example contents of electronic mails to be transmitted to the display information management server 30. As shown in FIG. 9A, the display information transmission processing section 14 sets the email address of the display information management sever 30 as a destination address, the email address of the mobile phone as a mail sender, and an arbitrary title as a subject. The display information transmission processing section 14 further sets a file name of the image data which is captured as a first attachment file and also sets a file name (which is "trouble photograph 3.jpg" in the above example) of the image data that the conference participant wishes to display in the image capturing range as a second attachment file. Here, the file names of the image data are determined as desired by the application installed in the mobile phone 10. Further, the main body of the electronic mail is not necessary in this case. Thus, the display information transmission processing section 14 generates and transmits an electronic mail including image capturing information and display information in response to the depression of the image capturing button 57.

While in the above example the image data to be displayed on the large display 41 exists in the mobile phone 10, the image data is not necessarily limited to a file existing in the mobile phone 10. When a conference participant wishes to display image data that does not exist in the mobile phone 10, the conference participant describes the storage location of the image data in the body of an electronic mail rather than inputting and designating the image data in the attach information loading setting region 53 shown in FIG. 7A. An example content of an electronic mail generated by this process is shown in FIG. 9B.

Figure 10:
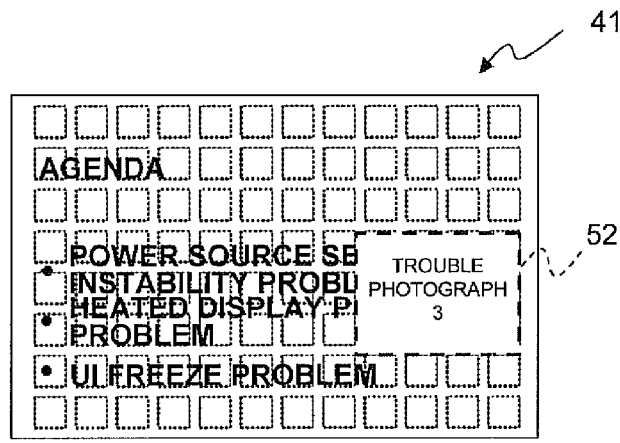
FIG. 10 is a view showing an example screen display after a display process on the large display is performed in the first exemplary embodiment.

The process of capturing an image of the large display 41 and the process of transmitting an electronic mail by the mobile phone 10 described above are implemented by pressing the image capturing button 57 by the conference participant. Then, when transmission of the email is completed, a confirmation screen illustrated in FIG. 7C is displayed. The conference participant then presses an OK button 58 or an application end button 59 for completing the application. On the other hand, in response to receipt of the electronic mail by the display information management server 30, each of the servers 20 to 40 performs processes for displaying the image data thus obtained in the image capturing range 52. A screen display example after the display processing with regard to the large display 41 has been performed is shown in FIG. 10. A series of processes performed after the reception of the email transmitted from the mobile phone 10 until display of the additional information (which is "trouble photograph 3.jpg" in this example) on the large display 41 will now be described.

In the display information management server 30, on receiving the electronic mail transmitted from any mobile phone 10 by the display information accepting section 31, the image data analyze processing section 32 analyses the image data attached as the first attachment file to the received email to extract each marker whose image has been captured and also obtain the marker ID of the each extracted marker. Because the marker ID contains information for specifying the conference server 40, the display information distributing section 33 transmits the display information including the decoded marker ID or the like to the conference server 40 which is specified by analysis of the marker ID.

In the conference server 40, when receiving the display information necessary for displaying the additional information transmitted from the display information management server 30, the display information combining section 43 generates information necessary for displaying the additional information on the large display 41 in the following manner. The processes performed in the display information combining section 43 will be described with reference to the flowchart shown in FIG. 11.

The display information combining section 43 first determines whether or not the transmitted display information having been subjected to image analysis includes the image data to be displayed (step S110). For example, in the case of the electronic mail shown in FIG. 9A described above, the content of the image data is included in the display information which is received, whereas in the case of the electronic mail as shown in FIG. 9B, the content of the image data is not included. Accordingly, when the substance of the image data is not included, the display information combining section 43 refers to the URL described in the body of the email to extract and obtain the image data file (step S120). The display information combining section 43 then writes and stores the image data file to be displayed in a predetermined storage region of the document management server 20 and obtains a URL as information that specifies the storage location of the file (step S130). Here, while the image data to be displayed is stored in the document management server 20 for the convenience of management, display would not be adversely affected even if the image file is kept within the conference server 40.

Then, the display information combining section 43 inquires to the marker managing section 46 based on the marker ID included in the display information that is transmitted, thereby obtaining the display content ID corresponding to the marker ID and the display position information (the center coordinates) of each marker that is read from the marker management table by the marker management section 46 (step S140). The display information combining section 43 generates information concerning the image data to be displayed based on the information obtained by the above processes and then sets and registers the information thus generated in a display link table (step S150).

Figures 12, 13:
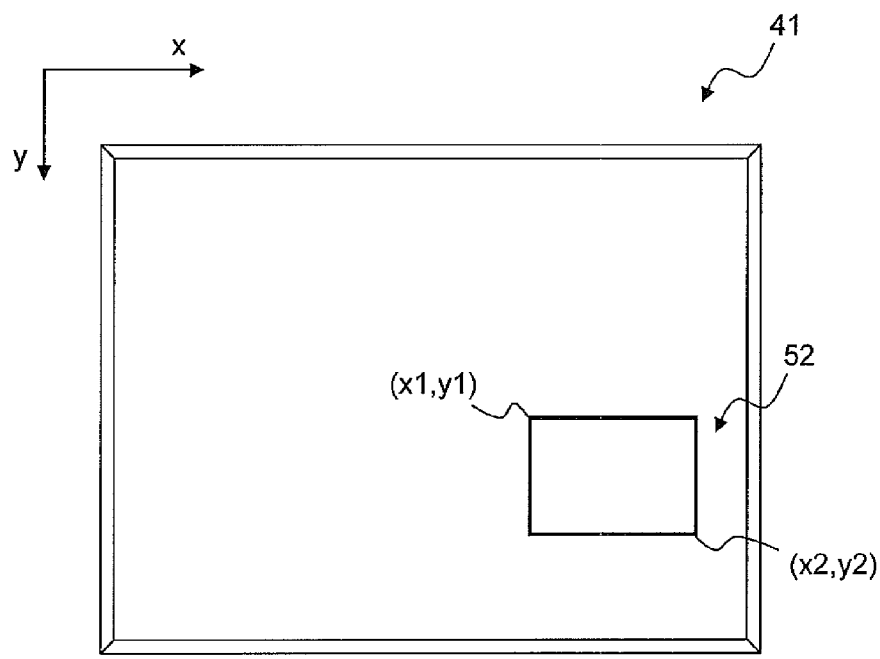
FIG. 12 is a view showing an example data structure of a display link table in the first exemplary embodiment.
FIG. 13 a conceptual view for explaining the setting content of display position information of image data to be additionally displayed in the first exemplary embodiment.

FIG. 12 shows an example data structure of the display link table according to the present exemplary embodiment. As shown in FIG. 12, the display information combining section 43 registers, as information which specifies the image data to be displayed, the display content ID of the image data (conference materials) displayed on the large display 41 at the time of image capturing, information concerning the storage location (which is a URL in the present exemplary embodiment) of the image data to be additionally displayed with regard to the image data being displayed, and the coordinates of the display region of the image data to be additionally displayed, in association with each other. The display content ID and the information concerning the storage location of the image data are already obtained in steps 140 and 130, respectively. The display region coordinates can be calculated from the center coordinates data and the size data of each marker. With the above information being set and registered, the image data (conference materials) displayed on the large display 41 at the time of image capturing is associated with the image data (photograph) to be additionally displayed on the image data.

FIG. 13 is a conceptual view for explaining the setting content of the display position information of the image data to be additionally displayed. In the present exemplary embodiment, the display region of the image data corresponds to the image capturing range 52 described above. In order to specify this display region, the coordinate data at the upper left corner (x1, y1) and the coordinate data at the lower right corner (x2, y2) of the display region having a rectangular shape are set as display position information of the image data. The display position information of the image data is not of course limited to the above example and may have coordinate data concerning all four corners of the display region, for example.

As described above, once the image data items are associated with each other, the display information combining section 43 instructs the display control section 44 to perform display on the large display 41 (step S160).

The display image combining section 47 in the display control section 44 inquires to the document management server 20 based on the display content ID registered in the display link table to thereby obtain the image data displayed at the time of image capturing. The document management server 20, having a correspondence table of the display content ID and the information concerning the storage location of the image data identified by the display content ID, in turn refers to this correspondence table to obtain the URL of the image data based on the display content ID which is accepted at the time of the inquiry, and retrieves and transmits the substance of the image data from the URL back to the conference server 40. Here, if the target image data currently remains displayed or the image data obtained when it was displayed in the past is still available, such image data can be used. Further, the display image combining section 47 inquires to the document management server 20 based on the URL of the image data to be additionally displayed that is registered in the display link table to obtain the image data. The display image combining section 47 then synthesizes both image data items thus obtained, to thereby generate a screen image to be displayed on the large display 41. As a result of this process, the display control section 44 displays the screen image shown in FIG. 10 on the large display 41.

Here, in order to allow the additional information such as a photograph and the conference materials being currently displayed to be managed in association with each other, or because it is practical to display both the additional information and the conference materials simultaneously and have discussions while referring to both items of information, it is desirable to allow a conference participant to capture an image of a portion of the display portion of the large display 41. However, it is also possible to cause a conference participant to capture an image of the whole display portion of the large display 41 and use the whole screen of the large display 41 for displaying the additional information.

Further, in the present exemplary embodiment, the display content ID is used as information for specifying the image data that is displayed and associated with the image data to be additionally displayed. In this case, when a unique content ID is assigned to each display image, a single large identifier space is used. If this is not desirable, it is possible to use a composite identifier formed by a combination of a document ID for identifying the whole conference materials, time information indicating the time when the image of each page of the conference materials is actually displayed, and an ID of the display apparatus used for display, for example, for association with the image data to be additionally displayed.

Exemplary Embodiment 2

In the first exemplary embodiment described above, the image data that a conference participant wishes to additionally display on the screen image being displayed is displayed in the image capturing range that is captured using the image capturing function of the mobile phone. In the present exemplary embodiment, the image data that is obtained by capturing an image of a portion of a large display is displayed in an image capturing range that is defined by capturing a portion of another large display using the image capturing function of the mobile phone. Stated simply, according to the present exemplary embodiment, a system that provides a copy and paste function is provided by application of the first exemplary embodiment.

Figure 14:
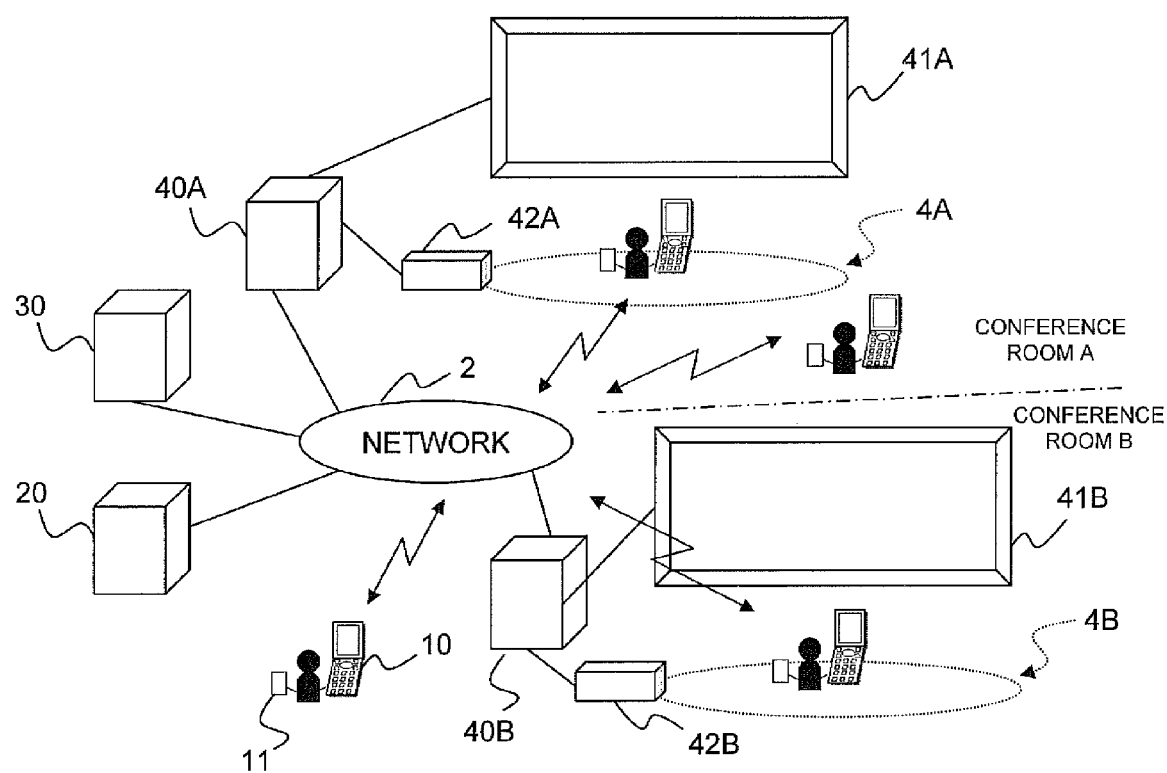
FIG. 14 schematically shows an overall structure of an electronic conference system according to a second exemplary embodiment.

FIG. 14 schematically shows the overall structure of an electronic conference system according to the second exemplary embodiment. In FIG. 14, elements that are the same as those in the first exemplary embodiment are designated by the same numerals. While the structure of the present exemplary embodiment is basically the same as that of the first exemplary embodiment, in order to achieve the copy and paste function, conference servers 40A and 40B, large displays 41A and 41B, and RFID sensors 42A and 42B are provided correspondingly to conference rooms A and B, respectively.

While in FIG. 14, the mobile phone 10 and the RFIF tag 11 carried by a conference participant are shown in front of each of the large displays 41A and 41B for the sake of convenience, in actual fact a single conference participant performs copy and paste of image data using the same mobile phone 10 and the RFIF tag 11.

Each element of the present exemplary embodiment can be shown by the block diagram of FIG. 2 as in the first exemplary embodiment, except that in the present exemplary embodiment, two conference servers 40A and 40B are connected to the network 2. Each of the conference servers 40A and 40B performs processes that differ slightly from the processes performed by the conference server 40 described in the first exemplary embodiment, and the process contents also differ slightly between the copy source conference server 40A and the copy destination conference server 40B, and such a difference will be described below. The data structure of information concerning the display position of the markers provided in each of the conference servers 40A and 40B may be the same as that in the first exemplary embodiment shown in FIG. 3.

The operation in the present exemplary embodiment will be described. Here, an example case will be described, where a certain user participating in an electronic conference, that is being conducted in the conference room A, captures an image of a portion of the image data being displayed on the large screen 41A using the mobile phone 10, then participates in an electronic conference being conducted in the conference room B, where the user pastes the image data captured in the conference room A using the mobile phone 10 onto a screen of the large screen 41B. In the following description, processes similar to those in the first exemplary embodiment will be appropriately simplified or omitted.

A particular user carrying the mobile phone 10 and the RFID tag 11 for individual use first participates in an electronic conference conducted in the conference room A. The conference material data to be used in this conference is previously registered in the document management server 20 by a presenter or the like, and the conference is conducted while the presenter changes the image data to be displayed on the large display 41.

Figure 15:
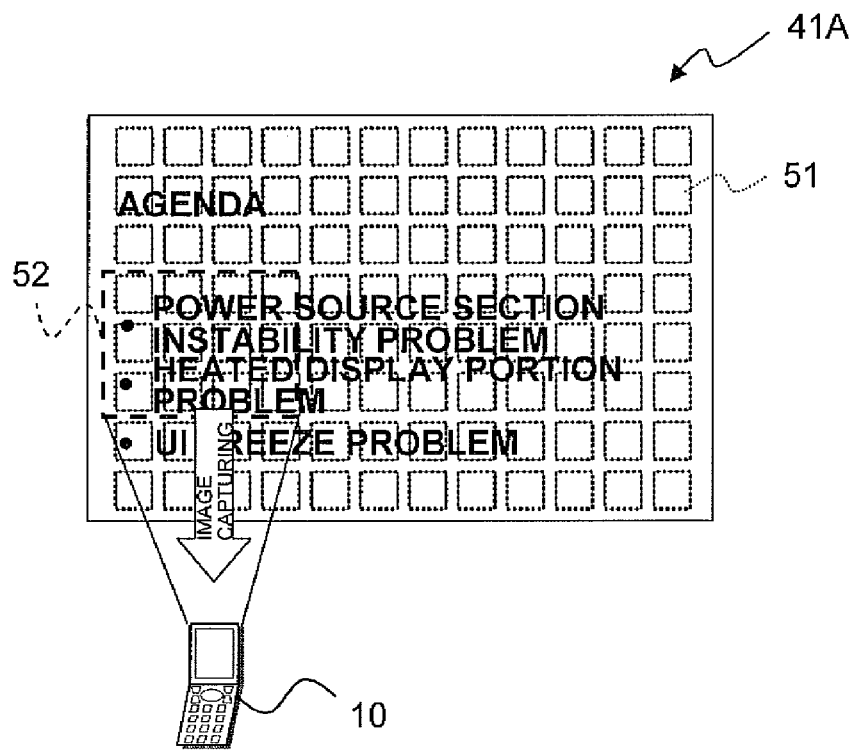
FIG. 15 is a conceptual view when a conference participant captures an image of a portion on a screen of a copy source large display in the second exemplary embodiment.

It is assumed that it is desired for the contents displayed on the large display 41A to be also displayed on the large display 41B in another conference room B so as to share the information, the discussion subject and so on. In this case, when the conference participant moves right to the large display 41A and enters the detection region 4A of the RFID tag 11 by the RFID sensor 42A, the approaching user detecting section 45 of the conference server 40A detects approach of the conference participant to the large display 41A. Consequently, the display control section 44 of the conference server 40A displays the markers on the large display 41A. Subsequently, the conference participant uses the camera of the mobile phone 10 to capture an image of the display portion that the conference participant wishes to copy to another large display 41B. An example screen display of the large display 41A when the conference participant enters the detection region 4A is shown in FIG. 15, in which the conference participant captures an image of the display portion which he/she wishes to copy onto the large display 41B. Here, the subject of the image capturing performed by the conference participant is the markers which specify the display position of the image data, not the image data itself, contained in the image capturing range 52.

As described above, the conference participant only needs to capture an image of the portion that he/she wishes to copy in the conference room A. Further, as the conference server 40A only displays the markers on the screen in response to the approach of the conference participant to the large display 41A, the display information combining section 43 and the display image combining section 47 are not necessary, contrary to the first exemplary embodiment described above.

Figure 16:
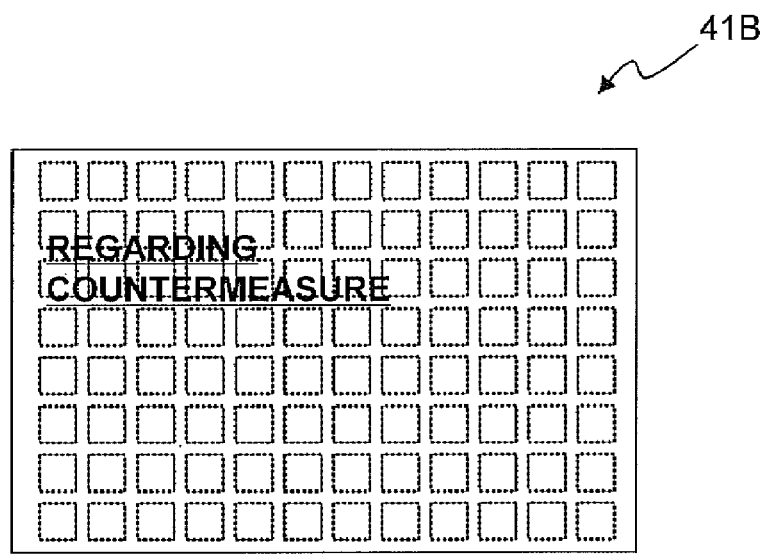
FIG. 16 is a view showing an example screen display of a copy destination large display in the second exemplary embodiment.

After performing image capturing in the conference room A, the user then participates in the electronic conference being conducted in the conference room B. When the conference participant moves to the large display 41B and enters the detection region 4B of the RFID tag 11 by the RFID sensor 42B, the approaching user detecting section 45 of the conference server 40B detects approach of the conference participant to the large display 41B. Consequently, the display control section 44 of the conference server 40B displays the markers on the large display 41B. An example screen display of the large display 41B when the conference participant enters the detection region 4B is shown in FIG. 16.

The conference participant standing in front of the large display 41 operates the mobile phone 10 to start the application provided by the present exemplary embodiment. FIGS. 17A to 17C show a transition of the display screen that is formed and displayed by the display information generation processing section 13 and is implemented by a portion of the present application. The transition of the display screen is basically the same as that in the first exemplary embodiment. More specifically, in FIG. 17A, the conference participant selects image data that he/she wishes to copy, from among a list of image data files stored in the mobile phone 10. FIG. 17A shows an example in which a file titled "20060101-020304.jpg" is selected. This file is an image data file generated by image capturing performed in the conference room A, and the file name thereof is automatically assigned by the application installed in the mobile phone 10. In the present exemplary embodiment, the file name is assigned such that the time and date of the image capturing can be specified. Here, from the viewpoint of the copy and paste function, the image data captured immediately before now may be automatically selected. The conference participant, confirming the selected image data on the display in the thumbnail display region 54, presses the aiming button 55, thereby starting the image capturing processing section 12 which makes full use of the camera function. The conference participant then captures an image of a portion on the screen of the large display 41B that defines a display region which is a copy destination. Image capturing at this time is shown in a conceptual view of FIG. 18. Further, FIG. 17B shows an example display of the mobile phone 10 at the time of aiming, in which the image capturing range captured by the camera lens is displayed in the display region 56.

Once image capturing is performed by pressing the image capture button 57 of the mobile phone 10, the display information transmission processing section 14 uses the electronic mail function of the mobile phone 10 to generate, as an electronic mail, the display information necessary for display on the large display 41B, and transmits the display information to the display information management server 30.

FIG. 19 shows an example content of the electronic mail to be transmitted to the display information management server 30. As shown in FIG. 19, the display information transmission processing section 14 sets the mail address of the display information management server 30 as a destination address, the mail address of the mobile phone 10 as a mail sender, and an arbitrary title as a subject. Further, the display information transmission processing section 14 sets, as a first attachment file, the file name (which is "20060101-020304.jpg" in the above example) of the copy source image data that is captured in the conference room A and sets, as a second attachment file, the file name of the copy destination image data that is captured in the conference room B. In this case, the main body of electronic mail is not necessary. The display information transmission processing section 14 thus generates and transmits the email containing information concerning image capturing and display in response to the depression of the image capturing button 57. Then, when transmission of the email is completed, the confirmation screen illustrated in FIG. 17C is displayed. The conference participant further presses the OK button 58 or the application completion button 59, thereby completing the application. The operation required for the conference participant is now complete, and the large display 41B shows a screen for the copy and paste completion, as shown in FIG. 20. As described above, the user operation with respect to the mobile phone 10 is basically the same as that in the first exemplary embodiment.

In the display information management server 30, when the display information accepting section 31 receives the email transmitted from any of the mobile phones 10, the image data analysis processing section 32 analyzes the image data attached to the received email as the first and second attachment files to extract each marker whose image is captured from each image data item and also obtain the marker ID of each extracted marker. Because the marker ID contains information for specifying the conference server 40, the display information distributing section 33 transmits the display information including the marker ID or the like obtained by decoding each image data item to the conference server that is specified from the image data attached to the second attachment file, that is the conference server 40B in this example.

Figure 21:
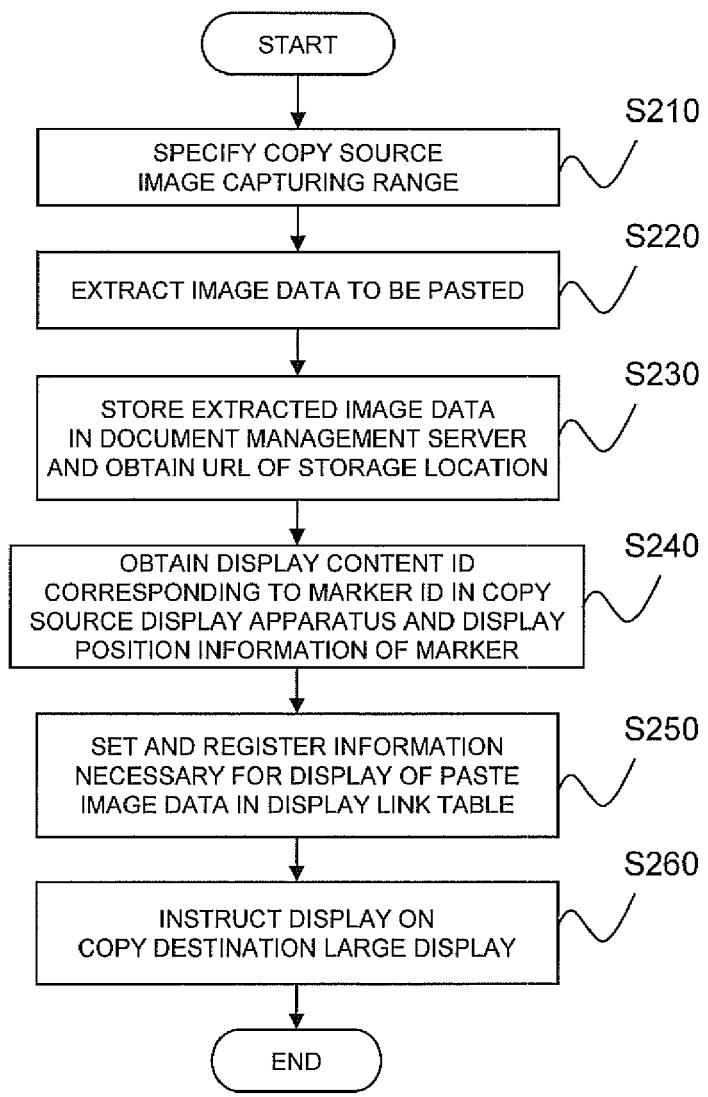
FIG. 21 is a flowchart showing processes executed by a display information combining section in the second exemplary embodiment.

In the conference server 40B, when the display information necessary for copy and paste is received from the display information management server 30, the display information combining section 43 generates information necessary for displaying the copy source image data on the large display 41B in the following manner. The processes in the display information combining section 43 of the conference server 40B will be described with reference to the flowchart shown in FIG. 21.

The display information combining section 43 first obtains, from the conference server 40A, the display position information (the center coordinates) of the marker ID specified from the copy source image data, and specifies the image capturing range 52 in the large display 41A by means of calculation from the center coordinates data of each marker thus obtained and the size data of each marker (step S210). Further, based on the marker ID specified from the copy source image data, the display information combining section 43 obtains the corresponding display content ID from the marker management table of the conference server 40A. Then, by inquiring to the document management server 20 based on this display content ID, the display information combining section 43 obtains the image data displayed on the large display 41A at the time of image capturing in the conference room A, and further extracts, from the image data thus obtained, image data in the portion corresponding to the image capturing region 52 specified in step S210 (step S220). The image data extracted as described above is to be actually pasted onto the large display 41B. The display information combining section 43 writes and stores the extracted image data file in a predetermined storage region of the document management server 20, and obtains an URL as information for specifying the storage location (step S230).

Figure 11:
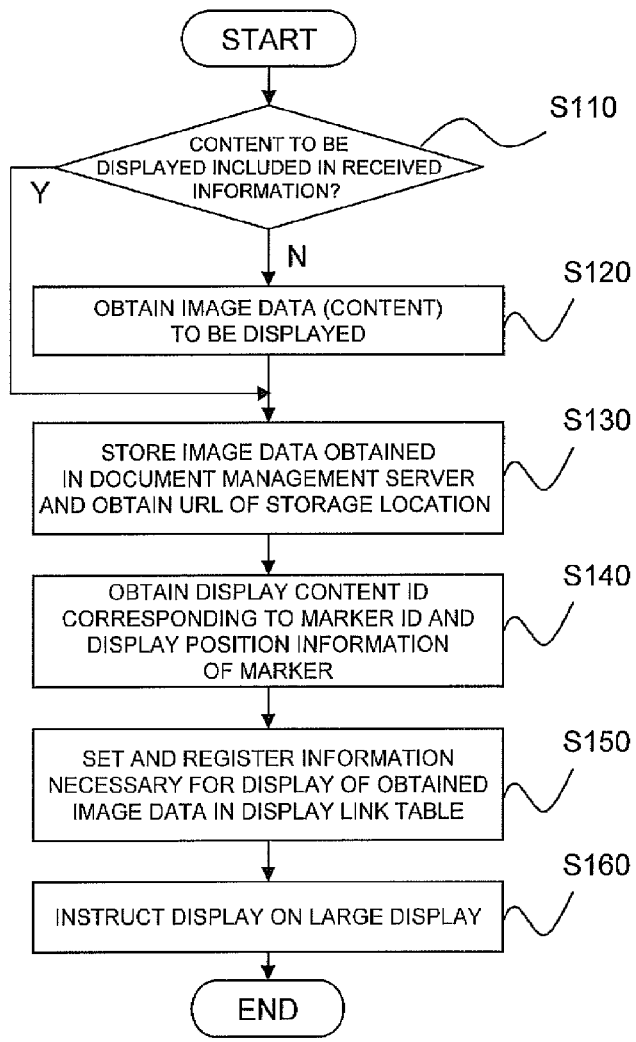
FIG. 11 is a flowchart showing processes to be executed by a display information combining section in the first exemplary embodiment.

The above-described series of processes until the information concerning the storage location (URL) of the image data file to be pasted is obtained correspond to steps 110 to 130 of FIG. 11 in the first exemplary embodiment. Further, the processes that will be described below are substantially the same as the processes in step 140 and the subsequent steps in the first exemplary embodiment.

Specifically, the display information combining section 43, based on the marker ID specified by the copy destination image data, obtains the display position information (the center coordinates) of each marker and the display content ID from the marker management section 46 (step S240), and correlates the display content ID, the URL obtained in step S230, and the display region coordinates that can be calculated from the center coordinates data and the size data of each marker with each other, and registers the correlation result in the display link table shown in FIG. 12 (step S250). By setting and registering the above information items, a portion of the image data (the conference materials) that is extracted from the large display 41A and is to be pasted on the large display 41B and the pasting region of the large display 41B are associated with reach other. The display information combining section 43, on associating the image data with the corresponding pasting region with each other as described above, instructs the display control section 44 to perform display on the large display 41B (step S260).

The display image combining section 47 of the display control section 44 in the conference server 40B inquires to the document management server 20 based on the display content ID registered in the display link table to obtain the image data displayed at the time of image capturing. Here, if the image data currently remains displayed or the image data when displayed in the past is still available, such image data may be used. Further, the display image combining section 47 inquires to the document management server 20 based on the URL of the image data to be pasted that is registered in the display link table to obtain the image data. The display image combining section 47 then synthesizes each image data item thus obtained to generate a screen image to be displayed on the large display 41. Here, the pasting location of the image data can be specified from the display region coordinates registered in association with the image data. As a result of the above processes, the display control section 44 displays the screen image shown in FIG. 20 on the large display 41B.

Further, according to the present exemplary embodiment, the information for specifying a region such as the image capturing range in the large display 41 is processed as relative information that is a ratio of such a region with respect to the size of the large display 41. Accordingly, even when there is a difference in size between the image capturing region in the copy source image and the image capturing region in the copy destination image, the image to be pasted can be expanded or reduced in accordance with the ratio, and thus the image displaying process within the designated display region may be performed easily.

In addition, while in the above example a case where an image obtained by capturing an image of the large display 41A in the conference room A is copied to the large display 41B in the different conference room B is described, a large display 41 need not necessarily be provided in another conference room and the present invention is also applicable to a case where both of the large displays 41A and 41B are provided in one conference room. Further, it is also possible that the large displays 41A and 41B are the same member and an image to be pasted that is obtained one day is pasted on another day. Also, while in the above exemplary embodiment, the conference server 40 is provided so as to correspond to each large display 41, the present invention is also applicable to the structure in which a single conference server 40 is used for performing display control of plural large displays 41.

Further, plural image data items may be synthesized with the screen image being displayed, so that various information may be accumulated by sequentially combining the plural image data items.

The foregoing description of the exemplary embodiments of the present invention has been provided for the purposes of the illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic conference system, comprising:
   a display;
   an information terminal device having an image capturing function;
   a display controller that controls the display to display an image and a marker for specifying a display position on a screen of the display;
   a marker management unit that stores information concerning the display position of the marker;
   an image capturing data obtaining unit that obtains image capturing data generated by capturing, when the marker is displayed, an image of at least a part of the screen using the information terminal device;
   a specification unit that specifies the display position of the marker included in the image capturing data based on the information stored in the marker management unit;
   a display data obtaining unit that obtains display data to be displayed; and
   a display image combining unit that displays the display data at a position of the screen, the position corresponding to the specified display position of the marker.

2. A computer readable recording medium storing an electronic conference support program causing a computer connected to a display to execute a process comprising:
   controlling the display to display an image and a marker for specifying a display position on a screen of the display;
   storing information concerning the display position of the marker;
   obtaining image capturing data generated by capturing, when the marker is displayed, an image of at least a part of the screen using an information terminal device having an image capturing function;
   specifying the display position of the marker included in the image capturing data based on the stored information;
   obtaining display data to be displayed; and
   displaying the display data at a position of the screen, the position corresponding to the specified display position of the marker.

3. The computer readable recording medium according to claim 2, wherein;
   displaying the display data includes combining the display data with an image which is being displayed on the screen.

4. The computer readable recording medium according to claim 2, wherein the display data is an image data captured by the information terminal device.

5. The computer readable recording medium according to claim 2, the process further comprising:
   detecting approach of a user who has the information terminal device to the screen, and
   displaying the marker in the screen image displayed on the screen such that an image of the marker can be captured, when approach of the user is detected.

6. The computer readable recording medium according to claim 2, wherein the information concerning the display position of the marker is formed of identification information of the marker, information for specifying image data displayed on the display when the marker is displayed on the screen, and information for specifying the display position of the marker on the display screen, in association with each other.

7. An electronic conference apparatus comprising:
   a display controller that controls the display to display an image and a marker for specifying a display position on a screen of the display;
   a marker management unit that stores information concerning the display position of the marker;
   an image capturing data obtaining unit that obtains image capturing data generated by capturing, when the marker is displayed, an image of at least a part of the screen using an information terminal device having an image capturing function;
   a specification unit that specifies the display position of the marker included in the image capturing data based on the information stored in the marker management unit;
   a display data obtaining unit that obtains display data to be displayed; and
   a display image combining unit that displays the display data at a position of the screen, the position corresponding to the specified display position of the marker.

8. A computer readable recording medium storing an electronic conference support program causing a computer mounted in an information terminal device having an image capturing function to execute a process comprising:
   generating image capturing data when an image of at least a portion of a screen of a display apparatus is captured, with a marker being displayed over the screen for specifying a display position on the screen;
   causing a user of the information terminal device to designate the image capturing data and information indicating display data to be displayed at the display position specified by the marker which is included in the image capturing data; and
   transmitting the designated image capturing data and the information indicating the display data.

9. An information terminal device, comprising:
   an image capture processing unit that generates image capturing data when an image of at least a portion of a screen of a display used in an electronic conference system is captured, with a marker being displayed over the screen for specifying a display position on the screen;
   a display information generation unit that causes a user of the information terminal device to designate the image capturing data and information indicating display data to be displayed at the display position specified by the marker which is included in the image capturing data; and
   a display information transmission unit that transmits the designated image capturing data and the information indicating the display data to a display information management computer included in the electronic conference system.

10. An electronic conference supporting method, comprising:
- displaying a marker for specifying a display position on a screen of a display used in an electronic conference system on the screen;
- generating image capturing data by capturing, when the marker is displayed on the screen, an image of at least a portion of the screen using an image capturing function provided with an information terminal device;
- accepting the image capturing data and information indicating display data to be displayed at the display position specified by the marker which is included in the image capturing data;
- generating and transmitting display information including the image capturing data and the information indicating the display data;
- specifying an image capturing region of the image capturing data on the screen based on information concerning the display position of the marker which is stored in a marker management unit;
- displaying the display data at a position of the screen, the position corresponding to the specified image capturing region.

11. An electronic conference system, comprising:
- a copy source display;
- a copy destination display;
- an information terminal device having an image capturing function;
- a copy source display controller that controls the copy source display to display an image and a marker for specifying a display position on a screen of the copy source display on the screen;
- a copy destination display controller that controls the copy destination display to display an image and a marker for specifying a display position on a screen of the copy destination display on the screen;
- a copy source marker management unit that stores information concerning the display position of the marker displayed on the copy source display;
- a copy destination marker management unit that stores information concerning the display position of the marker displayed on the copy destination display;
- a copy source image obtaining unit that obtains copy source image capturing data which is generated, when the marker is displayed on the screen of the copy source display, by capturing an image of at least a portion of the screen using an information terminal device having an image capturing function;
- a copy source image capturing region specification unit that specifies a captured range of the copy source image capturing data based on the marker included in the copy source image capturing data and the information stored in the copy source marker management unit;
- a copy destination image obtaining unit that obtains copy destination image capturing data which is generated, when the marker is displayed on the screen of the copy destination display, by capturing an image of at least a portion of the screen using an information terminal device having an image capturing function;
- a copy destination image capturing region specification unit that specifies a captured range of the copy destination image capturing data based on the marker included in the copy destination image capturing data and the information stored in the copy destination marker management unit;
- a paste image extraction unit that retrieves, from a memory, image data displayed on the copy source display at the time of image capturing performed, and extracts, as paste image data, image data in a portion of the retrieved image data corresponding to the image capturing region specified by the copy source image capturing region specification unit; and
- a display image combining unit that combines image data being displayed on the copy destination display with the paste image data to be displayed in the image capturing region specified by the copy destination image capturing region specification unit to generate a screen image to be displayed on the copy destination display.

12. A computer readable recording medium storing an electronic conference support program causing a computer to execute a process comprising:
- controlling a copy destination display used in an electronic conference system to display an image and a marker for specifying a display position on a screen of the copy destination display on the screen;
- storing information concerning the display position of the marker displayed on the copy destination display;
- obtaining, from a copy source marker management unit, information concerning the display position of the marker included in an image capturing range of copy source image capturing data obtained, when the marker is displayed in a superimposed manner on a screen of a copy source display, by capturing an image of the screen using an information terminal device having an image capturing function, and specifying an image capturing range on the display screen based on the information concerning the display position of the marker that is obtained;
- obtaining, from the information that is stored and managed, information concerning the display position of the marker included in an image capturing range of copy destination image capturing data obtained, when the marker is displayed in a superimposed manner on a screen of a copy source display, by capturing an image of the screen using an information terminal device having an image capturing function, and specifying an image capturing range on the display screen based on the information concerning the display position of the marker that is obtained;
- retrieving, from a memory, image data displayed on the copy source display at the time of image capturing performed, and extracting, as paste image data, image data in a portion of the retrieved image data corresponding to the specified image capturing range; and
- combining image data displayed on the copy destination display apparatus with the paste image data to be displayed in the image capturing range specified by the stored information concerning the display position of a marker displayed on the copy destination display, to generate a screen image to be displayed on the copy destination display.

13. An electronic conference control apparatus, comprising:
- a copy source display;
- a copy destination display;
- an information terminal device having an image capturing function;
- a copy source display controller that controls the copy source display to display an image and a marker for specifying a display position on a screen of the copy source display on the screen;
- a copy destination display controller that controls the copy destination display to display an image and a marker for specifying a display position on a screen of the copy destination display on the screen;

a copy source marker management unit that stores information concerning the display position of the marker displayed on the copy source display;

a copy destination marker management unit that stores information concerning the display position of the marker displayed on the copy destination display;

a copy source image obtaining unit that obtains copy source image capturing data which is generated, when the marker is displayed on the screen of the copy source display, by capturing an image of at least a portion of the screen using an information terminal device having an image capturing function;

a copy source image capturing region specification unit that specifies a captured range of the copy source image capturing data based on the marker included in the copy source image capturing data and the information stored in the copy source marker management unit;

a copy destination image obtaining unit that obtains copy destination image capturing data which is generated, when the marker is displayed on the screen of the copy destination display, by capturing an image of at least a portion of the screen using an information terminal device having an image capturing function;

a copy destination image capturing region specification unit that specifies a captured range of the copy destination image capturing data based on the marker included in the copy destination image capturing data and the information stored in the copy destination marker management unit;

a paste image extraction unit that retrieves, from a memory, image data displayed on the copy source display at the time of image capturing performed, and extracts, as paste image data, image data in a portion of the retrieved image data corresponding to the image capturing region specified by the copy source image capturing region specification unit; and a display image combining unit that combines image data being displayed on the copy destination display with the paste image data to be displayed in the image capturing region specified by the copy destination image capturing region specification unit to generate a screen image to be displayed on the copy destination display.

14. A computer readable recording medium storing an electronic conference support program causing a computer mounted in an information terminal device having an image capturing function to execute a process comprising:

capturing, when a marker for specifying a display position on a screen of a copy source display is displayed on the screen, an image of at least a portion of the screen of the copy source display used in a conference to generate source image data;

capturing, when a marker for specifying a display position on a screen of a copy destination display is displayed on the screen, an image of at least a portion of the screen of the copy destination display used in a conference destination image data;

transmitting the source image data and the destination image data to a display information management computer included in the electronic conference system.

15. An information terminal device, comprising:

an image capturing unit that captures, when a marker for specifying a display position on a screen of a copy source display is displayed on the screen, an image of at least a portion of the screen of the copy source display used in a conference to generate source image data; said image capturing unit also captures, when a marker for specifying a display position on a screen of a copy destination display is displayed on the screen, an image of at least a portion of the screen of the copy destination display used in a conference to generate destination image data; and a display information transmission unit that transmits display information including the source image data and the destination image data to a display information management computer included in an electronic conference system.

16. An electronic conference supporting method, comprising:

displaying a marker for specifying a display position on a screen of a copy source display used in an electronic conference system on the screen;

generating source image capturing data by capturing, when the marker is displayed on the screen of the copy source display, an image of at least a portion of the screen using an image capturing function provided with an information terminal device;

displaying a marker for specifying a display position on a screen of a destination source display used in an electronic conference system on the screen;

generating destination image capturing data by capturing, when the marker is displayed on the screen of the copy destination display, an image of at least a portion of the screen using an image capturing function provided with an information terminal device;

transmitting display information including the generated image capturing data;

specifying an image capturing region of the source image capturing data based on the marker included in the source image capturing data;

specifying an image capturing region of the destination image capturing data based on the marker included in the destination image capturing data;

retrieving, from a memory, image data displayed on the copy source display apparatus at the time the image capturing performed;

extracting, as paste image data, image data included in the specified image region of the retrieved image data;

combining image data displayed on the copy destination display apparatus with the paste image data to be displayed in the specified image capturing region, to generate a screen image; and displaying the screen image which is generated on the copy destination display apparatus.

* * * * *